(12) United States Patent
Raschke et al.

(10) Patent No.: US 11,085,481 B2
(45) Date of Patent: Aug. 10, 2021

(54) INSERT AND METHOD FOR CONNECTING AN ELECTRICAL CONNECTION TO A WALL

(71) Applicant: FAIRCHILD FASTENERS EUROPE—CAMLOC GMBH, Kelkheim (DE)

(72) Inventors: Nikolas Raschke, Wiesbaden (DE); Philipp Scholz, Olsbrücken (DE)

(73) Assignee: FAIRCHILD FASTENERS EUROPE - CAMLOC GMBH, Kelkheim (DE)

( * ) Notice: Subject to any disclaimer, the term of this patent is extended or adjusted under 35 U.S.C. 154(b) by 372 days.

(21) Appl. No.: 16/304,499

(22) PCT Filed: Jul. 4, 2017

(86) PCT No.: PCT/EP2017/066587
§ 371 (c)(1),
(2) Date: Nov. 26, 2018

(87) PCT Pub. No.: WO2018/011008
PCT Pub. Date: Jan. 18, 2018

(65) Prior Publication Data
US 2019/0293105 A1    Sep. 26, 2019

(30) Foreign Application Priority Data
Jul. 12, 2016 (DE) .......................... 10 2016 112 782

(51) Int. Cl.
*F16B 39/00* (2006.01)
*F16B 35/06* (2006.01)
(Continued)

(52) U.S. Cl.
CPC .............. *F16B 35/06* (2013.01); *F16B 17/00* (2013.01); *F16B 17/006* (2013.01); *F16B 2001/0064* (2013.01)

(58) Field of Classification Search
CPC . F16B 17/00; F16B 17/006; F16B 2001/0064
(Continued)

(56) References Cited

U.S. PATENT DOCUMENTS 3,451,303 A * 6/1969 Biermann ........... F16B 19/1054
411/70
3,515,419 A * 6/1970 Baugh ................. F16B 19/1027
403/408.1
(Continued)

FOREIGN PATENT DOCUMENTS

CN    103996908 A1    8/2014
DE    69307028 T2     6/1997
(Continued)

OTHER PUBLICATIONS

International Search Report and Written Opinion of the International Searching Authority for International Application No. PCT/EP2017/066587.

*Primary Examiner* — Gary W Estremsky
(74) *Attorney, Agent, or Firm* — K&L Gates LLP

(57) ABSTRACT

The invention relates to an insert for connecting an electrical connector to a wall (9) and to a corresponding method. The insert comprises an electrically conductive bolt (1) having a head (3), which extends along a first longitudinal axis (I), and a shaft (4), which is provided with at least one connecting means (5), and a ring (2), which has a through-opening (7) and extends along a second longitudinal axis (II). The head (3) comprises an outer contour which, at least in regions, is produced by the rotation about the first longitudinal axis (I) of a first line (L1), which is curved with a first radius (R1) and spaced apart from the first longitudinal axis (1). The through-opening (7) comprises an inner contour which, at least in regions, is produced by the rotation about the second longitudinal axis (II) of a second line (L2), which
(Continued)

is curved with a second radius (R2) and spaced apart from the second longitudinal axis (II).

20 Claims, 1 Drawing Sheet

(51) Int. Cl.
*F16B 17/00* (2006.01)
*F16B 1/00* (2006.01)

(58) Field of Classification Search
USPC .................. 411/107, 97, 807, 380, 339, 183
See application file for complete search history.

(56) References Cited

U.S. PATENT DOCUMENTS

| | | | | |
|---|---|---|---|---|
| 4,048,898 A | * | 9/1977 | Salter | ............... F16B 5/02 411/44 |
| 4,170,920 A | * | 10/1979 | Siebol | ............ F16B 19/1054 411/43 |
| 4,671,583 A | | 6/1987 | Olson et al. | |
| 4,921,371 A | * | 5/1990 | Boiraeu | ........... F16B 19/1081 403/408.1 |
| 5,267,832 A | * | 12/1993 | Johnson | ................ F16B 17/00 415/115 |
| 5,803,686 A | * | 9/1998 | Erbes | ..................... G21C 5/10 411/55 |
| 6,190,102 B1 | * | 2/2001 | Vignotto | ................ B60B 3/165 301/105.1 |
| 6,244,517 B1 | | 6/2001 | Courtois et al. | |
| 6,257,939 B1 | | 7/2001 | Courtois et al. | |
| 6,325,580 B1 | * | 12/2001 | Diamond | ............. F16B 37/067 411/40 |
| 7,118,317 B2 | * | 10/2006 | Hofschneider | .......... B60B 3/16 411/402 |
| 7,717,659 B2 | * | 5/2010 | Lang | ..................... F16B 4/004 411/533 |
| 9,341,205 B2 | * | 5/2016 | Guerin | ..................... F16B 5/02 |
| 2006/0159545 A1 | * | 7/2006 | Humpert | ............. B23P 19/062 411/181 |
| 2014/0230228 A1 | | 8/2014 | Whitlock et al. | |

FOREIGN PATENT DOCUMENTS

| | | |
|---|---|---|
| DE | 29815369 U1 | 3/1999 |
| EP | 1376766 B1 | 1/2004 |
| FR | 2716243 A1 | 8/1995 |
| JP | S50-46196 Y | 12/1975 |
| JP | 2002-180555 A | 6/2002 |
| JP | 2004340211 A | 12/2004 |
| JP | 2005-172190 A | 6/2005 |
| JP | 2014-165168 A | 9/2014 |
| WO | WO 98/06917 A1 | 2/1998 |
| WO | WO 2005/064771 A1 | 7/2005 |

* cited by examiner

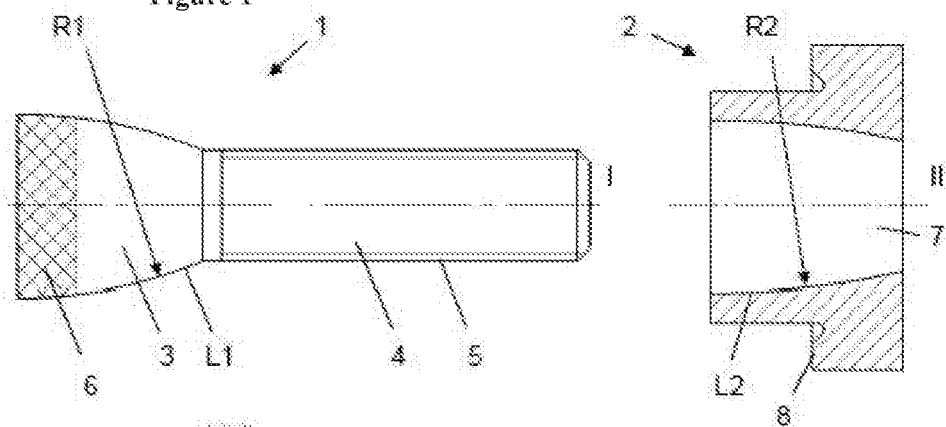
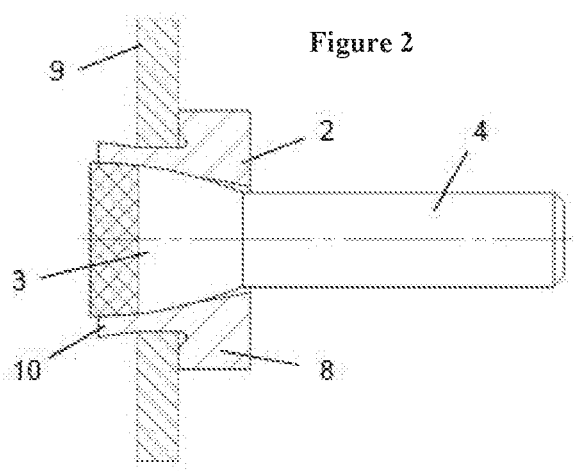
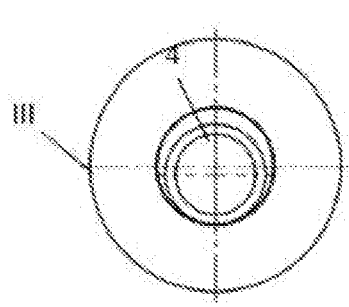 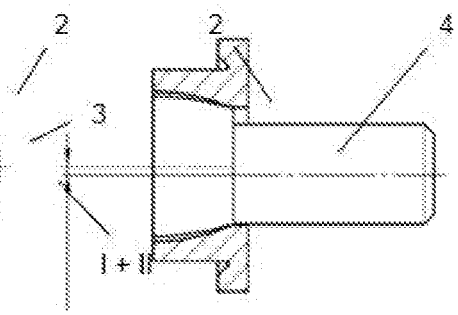

INSERT AND METHOD FOR CONNECTING AN ELECTRICAL CONNECTION TO A WALL

This application is a national stage application claiming priority to and the benefit of International Application No. PCT/EP2017/066587, filed on Jul. 4, 2017, which claims priority to and the benefit of German Patent Application No. 10 2016 112 782.5, filed Jul. 12, 2016.

The invention relates to an insert and a method for connecting an electrical connector to a wall, for example a thin metal sheet.

Fastening a bolt (ground bolt or grounding bolt) to a metal sheet using a deformable sleeve is a known method of establishing electrical conductivity between a cable and a metal sheet. To do this, the connection must withstand tensile forces and a torque that can, for example, be produced by a nut when a cable lug is fastened onto the threaded bolt. This is accomplished with radial widening and increased surface pressure in the area of the metal sheet. The sleeve additionally widens beyond the metal sheet, so that increased tensile force can be achieved. The transmission of the current takes place on the walls of the bore in the metal sheet. The installation and deformation of the sleeve must ensure that the contact resistance is as low as possible in this area.

An insert of the above-mentioned type, which comprises an electrically conductive bolt and a ring, is known from EP 0 880 199 B1. The bolt comprises a head which extends along a first longitudinal axis and a shaft which is provided with at least one connecting means. For receiving the bolt, the ring is provided with a through-opening which extends along a second longitudinal axis. The head of the bolt is configured as a truncated cone, which widens the cylindrical through-opening of the ring when the head is pulled into the ring. This combination of a cone with a cylindrical bore causes a relatively high force and deformation at the beginning of the process still outside the actual connection point. An insert having a ring, which is partially conical on the inside, and a frustoconical threaded sleeve is further known from EP 1 376 766 B1.

It is therefore an object of the present invention to provide an improved insert or an improved method, which in particular provides a more uniform force profile when the bolt is fitted into the ring, a better ability to influence the actual connection point, and/or a lesser increase in force with a larger clamping area.

This object is achieved with an insert having the feature of Claim 1 and a method having the feature of Claim 10.

The head of the insert preferably comprises an outer contour which, at least in regions, is produced by the rotation about the first longitudinal axis of a first line, which is curved with a first radius and spaced apart from the first longitudinal axis. The through-opening of the ring is further provided with an inner contour which, at least in regions, is produced by the rotation about the second longitudinal axis of a second line, which is curved with a second radius and spaced apart from the second longitudinal axis. Because of the two radii, it is possible to keep the overlap outside the connection point, i.e. the area in which the ring is pressed against the wall, smaller, and consequently to keep the installation forces down. In addition, due to a tangent runout of the radii, the forces for larger clamping areas can be kept more uniform.

According to a preferred embodiment of the invention, the first line is arranged such that, on the side of the head opposite to the shaft, it is at least approximately parallel to the first longitudinal axis. The second line can similarly also be arranged such that, on one end of the ring, it is at least approximately parallel to the second longitudinal axis. This is preferably the end of the ring that, in the assembled state, i.e. when the bolt is inserted into the ring, faces toward the head of the bolt and away from the shaft of the bolt.

It has been proven to be expedient for the entire outer contour of the head to be produced by a rotation of the first line about the first longitudinal axis. Alternatively or additionally, the inner contour of the through-opening can be defined exclusively by a rotation of the second line about the second longitudinal axis.

The design of the inner contour of the ring and the outer contour of the head as rotational bodies which are produced by curved lines, in particular, allows defined regions of the ring to be selectively deformed by widening by the head of the bolt. It has proven to be particularly advantageous, if the outer contour and the inner contour are adapted to one another such that the ring is radially widened in a region which, in the assembled state, is located in a through-opening of the wall, and/or that the ring is radially widened in a region which, in the assembled state, is located outside the through-opening of the wall with the formation of a ridge or a projection. A particularly good mechanical connection of the ring to the wall and the bolt to the ring is thereby achieved, which leads to a low electrical contact resistance. Defined local deformation of the ring by the head of the bolt also has the effect that the forces needed to accomplish this are comparatively low.

The design of the radii and the arrangement of the lines, which form the outer contour of the head or the inner contour of the through-opening, is preferably selected such that the region of the head facing the shaft can be inserted into the region of the through-opening of the ring having the larger diameter with a clearance fit. The outer diameter of the shaft of the bolt is also preferably smaller than the smallest inner diameter of the through-opening of the ring. The first radius is preferably different than the second radius. The first radius is in particular smaller than the second radius. This has the effect that the ring, and possibly also the bolt, are plastically deformed when the head of the bolt is pressed into the through-opening of the ring. This results in a particularly uniform deformation of the ring, which can bring the ring into contact with the inner wall of a through-opening in the wall in a defined manner. It is also possible to expand the ring on one side of the wall in such a way that the ring forms a ridge or projection, thereby pressing it against the wall.

The distance between the first curved line and the first longitudinal axis is expediently selected such that said distance increases from the shaft-side end of the head to the opposite end of the head. The degree of deformation of the ring therefore increases as the bolt continues to be pressed into the ring.

The at least one connecting means is preferably an internal thread or an external thread of the shaft. The bolt can therefore be pulled into the ring by means of a corresponding counter element, for example a nut. Further connecting means, which can in particular cause an axial lift of the bolt relative to the ring, can alternatively or additionally be provided as well. Connecting means can also be used to connect a connecting terminal or the like to the bolt. The ring can alternatively also be connected directly to an electrical connector.

If the bolt is pulled into the ring by means of a threaded nut, for example, a rotation of the bolt relative to the ring is undesirable. In order to at least make such a rotation of the bolt relative to the ring more difficult, some regions of the outer contour of the head can be provided with a profile. Such a profile can be a knurling, for example, which is in particular provided in a region of the head that faces away from the shaft. The profile can alternatively or additionally also comprise longitudinal grooves and/or longitudinal ribs. Such a profile can also be provided on the inner contour of the ring.

Independent of a profile on the outer contour of the head, a rotation of the bolt relative to the ring can at least be made more difficult if the shaft of the bolt extends along a third longitudinal axis which is parallel and offset to the first longitudinal axis. In other words, the shaft is arranged eccentrically to the head.

With such an eccentric arrangement of the head relative to the shaft, a torque exerted on the shaft by means of a threaded nut, for example, can at least partially be supported by the head. In order to prevent a corotation of the ring within the through-opening of the wall, the second longitudinal axis of the ring is expediently arranged concentrically to the first longitudinal axis of the head of the bolt. In other words, the shaft is positioned eccentrically to both the head and the ring.

According to a preferred embodiment, the ring is provided with a shoulder having an outer diameter that is relatively larger than the rest of the ring. The ring can thus comprise an outer contour with two respectively cylindrical sections, for example, of which the section with the larger outer diameter forms the shoulder. By means of the shoulder, the ring can rest against one side of the wall to be connected to the electrical connector in a region surrounding the through-opening of said wall.

The distance between the second curved line and the longitudinal axis preferably increases from one end of the ring to the opposite end of the ring. It is preferred if, in the assembled state of the insert, i.e. when the bolt is pressed into the ring, the shaft-side end of the ring has the smaller inner diameter and the opposite head-side end of the ring has the larger inner diameter. In order to bring about a plastic deformation of the ring, the head comprises at least one region that has an outer diameter which is greater than the inner diameter of a region of the ring.

A method according to the invention for producing a connection of an electrical connector to a wall can first require the provision of an insert of the above-mentioned type, wherein the bolt and/or the ring is connected to the electrical connector or can subsequently be connected to said electrical connector. First, the ring of the insert can be inserted into a through-opening of the wall. To do this, the ring is preferably provided with a shoulder, which can rest against one side of the wall when the ring is completely inserted into the through-opening of said wall. The shaft of the bolt can subsequently be inserted into the ring from the side opposite to the shoulder. The ring can then be deformed by a movement of the head relative to the ring along the second longitudinal axis, with the formation of a ridge or projection of the ring on the side of the wall opposite to the shoulder.

Additional features, advantages, and possible applications of the present inventions further result from the following description of design examples and with reference to the drawings.

The figures schematically show:

FIG. 1 a sectional view of an insert according to the invention according to a first embodiment prior to installation, FIG. 2 a sectional view of the insert according to FIG. 1 after installation in a wall, FIG. 3 a sectional view of an insert according to the invention according to a second embodiment prior to installation, and FIG. 4 a plan view of the insert according to FIG. 3.

The insert depicted in FIGS. 1 and 2 comprises a bolt 1 and a ring 2, which are shown separately in FIG. 1, i.e. prior to being assembled. The bolt 1 extends along a first longitudinal axis I. The ring 2 extends along a second longitudinal axis II.

The bolt 1 comprises a head 3 and a shaft 4. In the illustrated embodiment, the shaft 4 is cylindrical with an external thread 5, onto which a not-depicted nut can be screwed. The shaft 4 can alternatively be provided with an internal thread or a cross bolt as the connecting means.

The diameter of the head 3 is enlarged with respect to the shaft 4. On its side facing away from the shaft 4, the head 3 in the illustrated embodiment is regionally provided with an optional knurling 6. The head 3 can alternatively also be provided with different profile.

The head 3 is designed as a rotational body, the outer contour of which is produced by the rotation of a curved line L1 about the first longitudinal axis I. In the illustrated design example, the line L1 is a circular segment with a radius R1, which is indicated not true to scale by an arrow in FIG. 1. The line L1 can alternatively also comprise regions with different radii of curvature and/or comprise an elliptical section. In the vicinity of the end facing away from the shaft 4 (left-hand end in FIG. 1), the line L1 can extend at least approximately parallel to the first longitudinal axis I. The line L1 is arranged and configured relative to the first longitudinal axis I such that the outer diameter of the head 3 increases from the end facing the shaft 4 to the opposite end. In the example of FIG. 1, a shoulder is formed between the shaft 4 and the head 3.

The ring 2 comprises a central through-opening 7, which is concentric to the second longitudinal axis II. The ring 2 is designed to be cylindrical on the outside and has a shoulder 8 with an enlarged outer diameter.

The through-opening 7 is internally configured as a rotational body, the contour of which is produced by the rotation of a curved line L2 about the second longitudinal axis II. In the depicted design example, the line L2 is a circular segment with a radius R2, which is indicated not true to scale by an arrow in FIG. 1.

The radius R1 is smaller than the radius R2. The line L2 can also comprise regions with different radii of curvature and/or comprise an elliptical section. In the vicinity of the left-hand end in FIG. 1, the line L2 can extend at least approximately parallel to the second longitudinal axis II. The line L2 is arranged and configured relative to the second longitudinal axis II such that the inner diameter of the through-opening 7 increases from the end with the shoulder 8 to the opposite end.

FIG. 2 shows the insert in its assembled state in a wall 9. The wall 9, for example a thin metal sheet, is provided with a through-opening for receiving the insert. First, the ring 2 in FIG. 2 is inserted from the right into the through-opening of the wall 9, so that the shoulder 8 rests against the right side of the wall 9. The outer cylindrical section with a smaller diameter extends through the through-opening of the wall 9 and in FIG. 2 protrudes from the left of said through-opening.

The bolt 1 is then inserted into the ring 2 from the left. In the assembled situation of FIG. 2, the bolt 1 has already been pulled into the ring 2, for example by means of a nut, not shown here, so that the shaft 4 has completely passed through the wall 9, and the head 3 of the bolt is located in the region of the through-opening of the wall 9. The head 3 has penetrated so far into the through-opening 7 of the ring 2 that the ring 2 is plastically deformed by the head 3. The head 3 has widened the ring 2 such that the outer surface of said ring is radially pressed against the through-opening of the wall 9. Electrical contact with a low contact resistance is thereby achieved between the bolt 1 and the inner side of the through-opening of the wall 9 via the ring 2. The head 3 has also radially widened the section of the ring 2 projecting through the through-opening of the wall 9, i.e. the section facing away from the shoulder 8, with the formation of a ridge-like projection 10. As a result, the ring 2 is also pressed against the wall 9 in axial direction, i.e. between the shoulder 8 and the ridge-like projection 10.

A connecting terminal, not shown here, can be connected directly to the ring 2 or, for example, be clamped onto the bolt 1 between the nut and the ring 2. The connecting terminal is thereby electrically connected to the wall 9 by means of the insert.

FIGS. 3 and 4 show a second embodiment of an insert according to the invention. This insert also consists of a bolt 1 and a ring 2, which can be inserted into a through-opening of a wall 9 as described above. In the second embodiment, however, the shaft 4 of the bolt 1 is not arranged concentrically with the head 3 and the longitudinal axis I, but is instead offset relative to said longitudinal axis I on a parallel third longitudinal axis III. In doing so, the shaft 4 is arranged eccentrically not only to the head 3, but also to the ring 2, the longitudinal axis II of which is furthermore concentric to the longitudinal axis I of the head 3. The result of this configuration is that a torque acting on the shaft 4 to press the bolt into the ring is at least partially supported, so that the head 3 does not rotate relative to the ring 2 and the ring 2 does not rotate in the through-opening of the wall 9.

LIST OF REFERENCE SIGNS

1 bolt
2 ring
3 head
4 shaft
5 external thread
6 knurling
7 through-opening
8 shoulder
9 wall
10 projection
I first longitudinal axis
II second longitudinal axis
III third longitudinal axis
L1 first line
L2 second line
R1 first radius
R2 second radius

The invention claimed is:

1. An insert for connecting an electrical connector to a wall, the insert comprising:
   an electrically conductive bolt comprising a head extending along a first longitudinal axis and a shaft; and
   a ring comprising a through-opening and extending along a second longitudinal axis, wherein the through-opening is configured to receive the bolt, wherein the ring can be deformed by movement of the head relative to the ring along the second longitudinal axis, thereby forming a projection of the ring;
   wherein the head comprises an outer contour which, at least in regions, is produced by rotation about the first longitudinal axis of a first line, wherein the first line is curved with a first radius and is spaced apart from the first longitudinal axis; and
   wherein the through-opening comprises an inner contour which, at least in regions, is produced by rotation about the second longitudinal axis of a second line, wherein the second line is curved with a second radius and is spaced apart from the second longitudinal axis, wherein the first radius differs from the second radius.

2. The insert of claim 1, wherein the first radius is smaller than the second radius.

3. The insert of claim 1, wherein a distance of the first curved line from the first longitudinal axis increases from a shaft-side end of the head to an opposite end of the head.

4. The insert of claim 2, wherein a distance of the first curved line from the first longitudinal axis increases from a shaft-side end of the head to an opposite end of the head.

5. The Insert of claim 1, wherein the shaft comprises at least one of an internal thread and an external thread.

6. The insert of claim 1, wherein at least a region of the outer contour of the head comprises a profile.

7. The insert of claim 1 wherein the shaft extends along a third longitudinal axis that is parallel to and offset from the first longitudinal axis.

8. The insert of claim 1, wherein the ring comprises a shoulder having an outer diameter that is larger than a remainder of the ring.

9. The insert of claim 1, wherein a distance of the second curved line from the second longitudinal axis increases from one end of the ring to an opposite end of the ring.

10. The insert of claim 2, wherein a distance of the second curved line from the second longitudinal axis increases from one end of the ring to an opposite end of the ring.

11. The insert of claim 1, wherein the head comprises a region having an outer diameter greater than an inner diameter of a region of the ring.

12. A method for connecting an insert to a wall, wherein the insert is configured to connect an electrical connector to the wall, the method comprising:
    providing the insert according to claim 1, wherein at least one of the bolt and the ring of the insert is or can be connected to an electrical connector;
    inserting the ring into a through-opening of the wall so that the shoulder of the ring contacts one side of the wall;
    inserting the shaft of the insert into the ring from a side of the ring opposite to the shoulder; and
    deforming the ring by moving the head of the insert relative to the ring along the second longitudinal axis, thereby forming a projection of the ring on a side of the wall opposite to the shoulder and forming a mechanical connection of the ring to the wall and the bolt to the ring.

13. The method of claim 12, wherein the first radius of the insert is smaller than the second radius of the insert.

14. An insert for connecting an electrical connector to a wall, the insert comprising:
    an electrically conductive bolt comprising a head extending along a first longitudinal axis and a shaft; and
    a ring comprising a through-opening and extending along a second longitudinal axis, wherein the through-opening is configured to receive the bolt, wherein the ring can be deformed by movement of the head relative to the ring along the second longitudinal axis, thereby forming a projection of the ring;

wherein the head comprises an outer contour which, at least in regions, is produced by rotation about the first longitudinal axis of a first line, wherein the first line is curved with a first radius and is spaced apart from the first longitudinal axis; and wherein the through-opening comprises an inner contour which, at least in regions, is produced by rotation about the second longitudinal axis of a second line, wherein the second line is curved with a second radius and is spaced apart from the second longitudinal axis; and wherein the shaft extends along a third longitudinal axis that is parallel to and offset from the first longitudinal axis.

15. The insert of claim 14, wherein a distance of the first curved line from the first longitudinal axis increases from a shaft-side end of the head to an opposite end of the head.

16. The Insert of claim 14, wherein the shaft comprises at least one of an internal thread and an external thread.

17. The insert of claim 14, wherein at least a region of the outer contour of the head comprises a profile.

18. The insert of claim 14, wherein the ring comprises a shoulder having an outer diameter that is larger than a remainder of the ring.

19. The insert of claim 14, wherein a distance of the second curved line from the second longitudinal axis increases from one end of the ring to an opposite end of the ring.

20. The insert of claim 14, wherein the head comprises a region having an outer diameter greater than an inner diameter of a region of the ring.

* * * * *